United States Patent [19]

Spainhour

[11] 4,147,405
[45] Apr. 3, 1979

[54] APPARATUS FOR ALIGNING ARTICLES

[75] Inventor: Carroll D. Spainhour, Princeton Township, Mercer County, N.J.

[73] Assignee: Western Electric Co., Inc., New York, N.Y.

[21] Appl. No.: 855,483

[22] Filed: Nov. 28, 1977

[51] Int. Cl.² ............................ G02B 5/14; B23Q 3/00
[52] U.S. Cl. .................................. 350/96.21; 29/468; 269/52; 350/81
[58] Field of Search ............... 350/96.20, 96.21, 96.22, 350/81; 29/464, 468; 269/54

[56] References Cited

U.S. PATENT DOCUMENTS

| 3,170,232 | 2/1965 | Craver | 29/464 |
| 3,727,289 | 4/1973 | Bemelmann et al. | 29/237 |
| 3,919,037 | 11/1975 | Miller | 350/96.21 |
| 3,922,064 | 11/1975 | Clark et al. | 350/96.22 |
| 3,999,841 | 12/1976 | Dakss et al. | 350/96.21 |
| 4,019,806 | 4/1977 | Fellows et al. | 350/96.21 |

OTHER PUBLICATIONS

"Eccentric Coupler for Optical Fibers", by Zemon et al., *Applied Optics*, Apr. 1975, pp. 815-816.

*Primary Examiner*—John K. Corbin
*Assistant Examiner*—Stewart Levy
*Attorney, Agent, or Firm*—A. S. Rosen; M. Pfeffer; D. P. Kelley

[57] ABSTRACT

Axial alignment of a pair of articles such as the ends of a pair of optical components is effected by an alignment device, which serves also as a connector. The alignment device employs a pair of sleeves, for holding the pair of articles, the sleeves being slidably and rotatably mounted in a pair of hingeably connected members. A pair of adjustment means disposed between the hinged members are used to move one of the members about the other member until the pair of articles are in axial alignment. An additional means is also included for locking the adjacent surfaces of the axially aligned pair of articles in a fixed position. Two embodiments of the device are disclosed.

15 Claims, 5 Drawing Figures

APPARATUS FOR ALIGNING ARTICLES

BACKGROUND OF THE INVENTION

1. Field of the Invention

The present invention relates to apparatus employing adjustment means for axially aligning pairs of articles, and more particularly, to an apparatus for aligning the core cross-sectional area of one optical component with that of another optical component, or with a center line of another optical component.

2. Description of the Prior Art

When coupling pairs of optical conductors for minimum light signal distortion and attenuation, it is necessary to align accurately the light carrying cores of the optical conductors. Core alignment is essential since light signal propagation occurs primarily in the cores and not in the surrounding cladding which is used primarily to provide optical insulation and protection. In most alignment procedures, it is possible to obtain alignment symmetry of the outer jacket of two conductors and yet still have axial misalignment of the inner cores. Similar problems are inherent in attempting to align an inner core of an optical conductor with a centerline of another optical component, such as an emitter or a detector.

One method of aligning the core of one optical conductor with that of another utilizes an eccentric coupler as described in an article entitled "Eccentric Coupler for Optical Fibers: a Simplified Version" by S. Zemon, et al., published in *Applied Optics*, April 1975, Vol. 14, No. 4, at page 815. This coupler comprises a V-block metal housing; a pair of sleeve-capillary units, each unit fabricated to be inserted into the ends of the V-block; and a shim affixed on the wall at one end of the V-block to cause the axis of one of the sleeves to be offset. The pair of conductors to be aligned are inserted and glued in the capillaries, and the sleeve-capillary units are installed on the V-block so as to cause the ends of the conductors to abut one another.

In operation, the alignment is accomplished by rotating the sleeve-capillary units about axes that are offset from each other. With an appropriate choice of offset dimensions, the two circles traced out by the rotating conductors intersect at two points whereat the conductor-to-conductor interface is optimized.

Although this coupler can be used to align axially the cores of two conductors, the alignment process appears to be a tedious and complicated process. To find one of the two intersecting positions without the benefit of having means for performing a cursory or coarse alignment of the conductors appears to be a matter of conjecture. Also, upon rotating both of the conductors to either of the two intersecting positions, confusion may arise as to which position provides the best alignment. Further, no structural elements are provided to optimize the alignment procedures to compensate for nonuniformity of the cross-sectional areas of the abutting core surfaces.

BRIEF SUMMARY OF THE INVENTION

The present invention relates to an apparatus for rapidly aligning pairs of optical conductors or other similar articles (such as, for example, an emitter and an optical conductor, or an optical conductor and a detector). The apparatus has a first member for holding a first article; a second member for holding a second article; and hinge means, having a first end hingeably connected to a first end of the first member and a second end hingeably connected to a first end of the second member, for connecting the first member to the second member to permit relative movement between the members. A first adjustment means is utilized for pivoting the first member relative to the second end of the hinge means to provide selective arcuate movements of the first article relative to the second article along a first arcuate path. A second adjustment means is utilized for pivoting the first member relative to the first end of the hinge means so as to provide selective arcuate movement of the first article relative to the second article along a second arcuate path that intersects the first arcuate path.

BRIEF DESCRIPTION OF THE DRAWINGS

Referring to the drawings, in which like numerals represent like parts in the several views.

DETAILED DESCRIPTION

Figure 1:
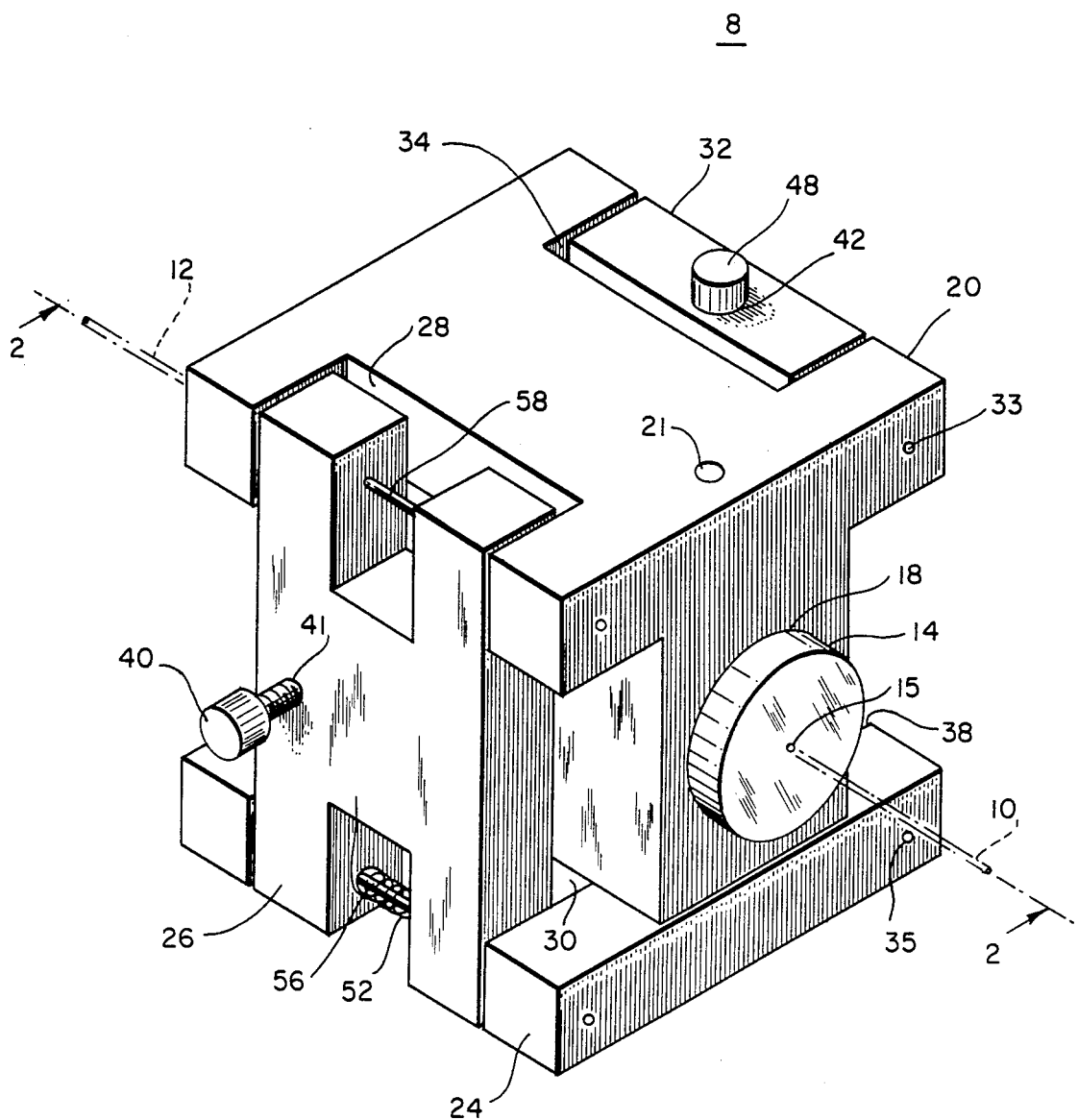
FIG. 1 is an isometric drawing of a first embodiment of the apparatus for aligning a pair of articles.
Figure 2:
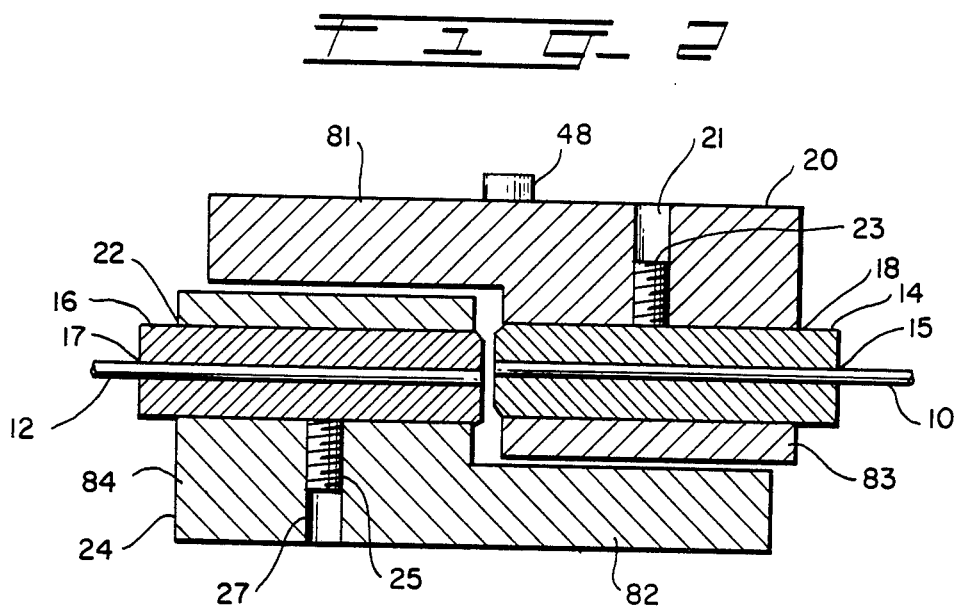
FIG. 2 is a cross-sectional view of the apparatus of FIG. 1 taken along the lines 2—2 of FIG. 1, illustrating particularly a locking arrangement of the apparatus.

With reference to FIGS. 1 and 2, a first optical conductor 10 and a second optical conductor 12 to be aligned, are inserted, respectively, in an aperture 15 of a first circular sleeve 14 and in an aperture 17 of a second circular sleeve 16 of an alignment apparatus or connector 8. A sealing wax (not shown) or a conventional sealing compound is used to affix the conductors 10 and 12 within the respective sleeve apertures 15 and 17. The first sleeve 14 is slidably and rotatably mounted in an aperture 18 of a generally L-shaped, first member 20. The second sleeve 16 is likewise slidably and rotatably mounted in an aperture 22 of a generally L-shaped, second member 24. To lock the first sleeve 14, after it is mounted in aperture 18, a first set screw 23 is threadably received in a bore 21 in the first member 20 with a lead end of the screw 23 extending into the aperture 18 of the first member 20. To lock the second sleeve 16, a second set screw 25 is, likewise, threadably received in a bore 27 of the second member 24 with a lead end of the screw 25 extending into the aperture 22 of the second member 24.

Figure 3:
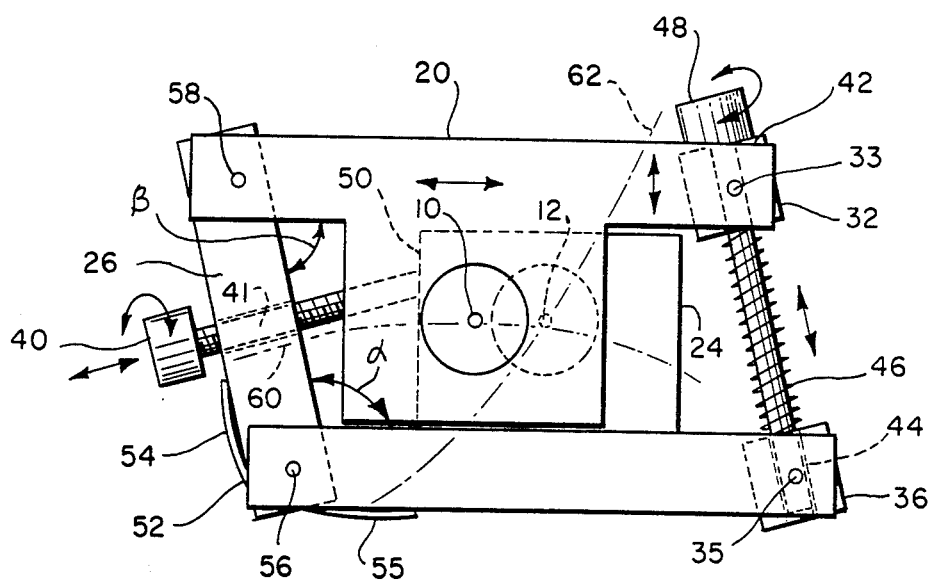
FIG. 3 is an end elevational view of the apparatus of FIG. 1 as viewed from the right, illustrating in particular, the operation of the apparatus.

A first end of an H-shaped hinge plate 26 is pivotally or hingeably mounted about a dowel 58 that is fixedly mounted within a first recess region 28 at a first end of the first member 20 to form a hinge connection; a second end of hinge plate 26 is pivotally or hingeably mounted about a dowel 56 that is fixedly mounted within a first recess region 30 of the second member 24 to form another hinge connection. A rectangular shaped first beam 32 is pivotally mounted about a pair of dowels 33 (only one of which is shown) which are fixedly mounted in a second recess region 34 at a second end of the first member 20. A second rectangular shaped beam 36, shown in FIG. 3, is pivotally mounted about a pair of dowels 35 (only one of which is shown) which are fixedly mounted within a second recess region 38 at a second end of the second member 24. As best seen in FIG. 2, the first member 20 and the second member 24 are so arranged that a leg 81 of the L-shaped first member 20 and a leg 82 of the L-shaped second member 24 extend parallel to one another; a base 83 of the first member 20 and a base 84 of the second member 24 extend parallel to one another; the leg 81 of the first member 20 extends in the direction of the base 84 of the second member; and the leg 82 of the second member 24 extends in the direction of the base 83 of the first member 20. Thus, the two L-shaped members 20 and 24 are arranged so as to complement one another. The height of the bases 83 and 84, i.e., the dimension of each along the axial direction of the respective aperture 18 or 22 therethrough, may advantageously by substantially equal to the length of the legs 81 and 82.

As seen in FIGS. 1 and 3, a first adjustment screw 40 is threadably coupled in a bore 41 within one leg of the H-shaped hinge plate 26 at the location shown so as to cause a lead end of the screw 40 to contact a face 50 of the second member 24. A first biasing means, such as for example, a conventional torsion spring 52, is disposed in the first recess region 30 about the dowel 56. As best viewed in FIG. 3, spring 52 has a first arm 54 and a second arm 55, and is used to exert simultaneously a pivoting force against the hinge plate 26 and the second member 24, severally, in such directions that the leading end surface of the first adjustment screw 40 maintains a point of contact with the surface 50 of the second member 24 during the occurrence of a clockwise or counterclockwise rotation of the first adjustment screw 40.

With the member 24 held fixed when the first adjustment screw 40 is rotated in a clockwise direction (as viewed in FIG. 1), the hinge plate 26 will pivot about the dowel 56 in a counterclockwise direction. More specifically, as best seen in FIG. 3, with the member 24 held fixed, the rotating, but non-advancing first adjustment screw 40 causes the hinge plate 26, to which it is threadably coupled, to withdraw along the threads of the screw 40 and to pivot about dowel 56 in a counterclockwise direction. In turn, pivoting of the hinge plate 26 causes the first member 20 to move with the hinge plate 26 and to thereby also pivot about the dowel 56.

When the first adjustment screw 40 is rotated in a counterclockwise direction, the hinge plate 26 and the first member 20 pivot about the dowel 56 in a clockwise direction. This results because the first arm 54 of torsion spring 52 bears against the surface of hinge plate 26 to cause the hinge plate 26 to advance over the threads of the first adjustment screw 40 as the first adjustment screw 40 is rotated within the threaded bore 41 of hinge plate 26.

An angle $\alpha$ formed between the hinge connection of the hinge plate 26 and the second member 24 at dowel 56 increases for clockwise rotations and decreases for counterclockwise rotations of the first adjustment screw 40. As the angle $\alpha$ is varied, the end of the first optical conductor 10 is repositioned along a largely horizontal arcuate path 60.

As the hinge plate 26 is pivoted about dowel 56, while pulling or pushing the first member 20 in one direction or the other, the first and second beams 32 and 36, respectively, are pivoted simultaneously about the dowels 33 and 35 to accommodate lateral displacement of a second adjustment screw 48.

The second adjustment screw 48 is received through an unthreaded bore 42 in the first beam 32 and is coupled to the second beam 36 (FIG. 3) at a threaded bore 44. A second biasing means, such as for example, a conventional coil spring 46 is disposed between the first beam 32 and the second beam 36, circumscribing the second adjustment screw 48, for causing a surface of the first beam 32 to bear continually against an inner surface of the head of the second adjustment screw 48 during the occurrence of a clockwise or a counterclockwise rotation of the second adjustment screw 48. The second adjustment screw 48 and the coil spring 46 are used to cause the first beam 32 to move downward or upward relative to the second beam 36 in response to clockwise or counterclockwise rotations, respectively, of the second adjustment screw 48. When the first beam 32 is moved, the first member 20 is pivoted about dowel 58 in a manner such that an angle $\beta$ formed between the hinge plate 26 and the first member 20 decreases for clockwise rotations and increases for counterclockwise rotations of the second adjustment screw 48. As the angle $\beta$ is varied, the end of the first optical conductor 10 that is housed in first member 20 is repositioned along a largely vertical arcuate path 62 which intersects the largely horizontal arcuate path 60.

In operation (see FIGS. 1, 2 and 3) the optical conductors 10 and 12 are mounted in sleeves 14 and 16, respectively; these sleeves are then inserted in the apertures 18 and 22 of the first and second members 20 and 24, respectively, of connector 8. Preferably, the apertures 18 and 22 are aligned approximately prior to insertion of the sleeves 14 and 16. This approximate alignment may be accomplished by inserting a rod (not shown) or one of the sleeves through both apertures 18 and 22.

After insertion of the sleeves 14 and 16 in the respective apertures 18 and 22, a suitable source of light (not shown) is connected to a remote end of the conductor 10 and a suitable light detector (not shown) is connected to a remote end of conductor 12, or vice versa. It should be recognized the connector of this invention may also be used to connect effectively such remote ends of the optical conductors 10 and 12 to the light source and the light detector, respectively, e.g., if the light source and detector have dimensions similar to the dimensions of the sleeves 14 and 16. For the sake of convenience, however, description of the operation of the connector 8 of this invention will be limited to forming the conductor-to-conductor interface.

With the second member 24 being held fixed by any suitable means (not shown), the first adjustment screw 40 is rotated in a direction to maximize the light received by the detector connected to the remote end of conductor 12. Next, the second adjustment screw 48 is rotated in a direction to further maximize the light received by the detector. This procedure of adjusting alternately the first and second adjustment screws for maximum light detection is repeated until no further maximization is possible, indicating that the terminus misalignment loss of the conductor-to-conductor interface is at a minimum. These adjustments, it should be noted, can be accomplished manually; also, it is well known in the art of control system design that suitable automatic circuit arrangements could be made to perform the adjusting of the adjustment screws of the connector 8.

If desired, physical and structural differences at the end faces of the optical conductors which may affect light transfer at the conductor-to-conductor junction can also be substantially compensated for with the connector 8. To compensate for end face differences, following the completion of the axial alignment, the sleeves 14 and 16 are rotated within their respective apertures 18 and 22 about the axial alignment positions attained previously to adjust the adjacent terminus surfaces to an optimum position. When this optimum position is obtained, the sleeves 14 and 16 are locked in place by the set screws 23 and 25, respectively.

Figure 4:
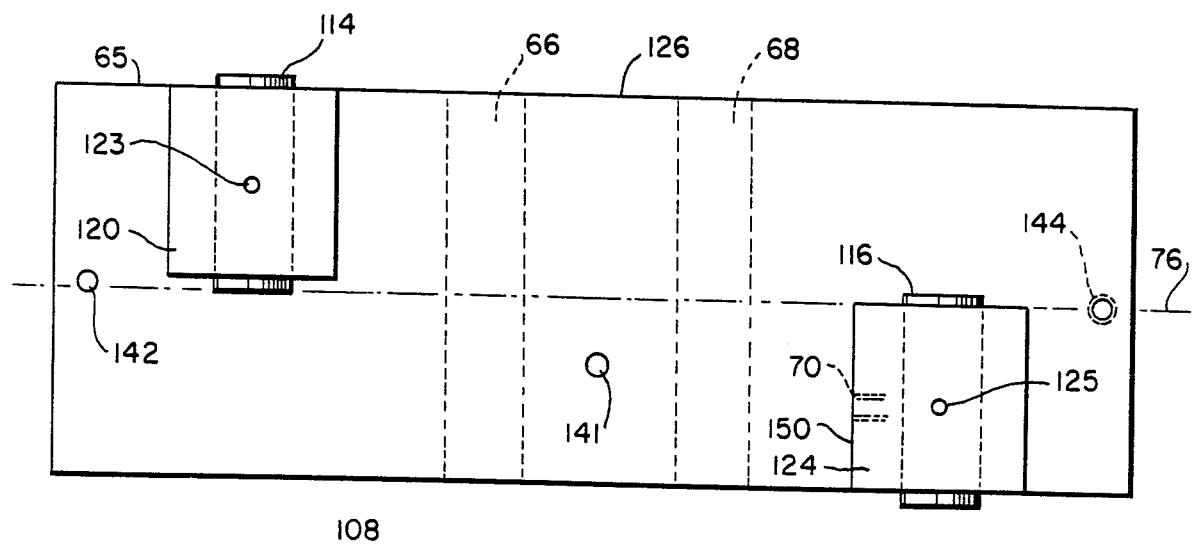
FIG. 4 shows in plan view a layout of parts needed for a second embodiment of the apparatus of FIG. 1.
Figure 4:
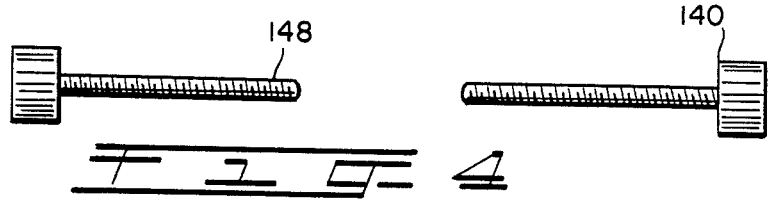
Figure 5:
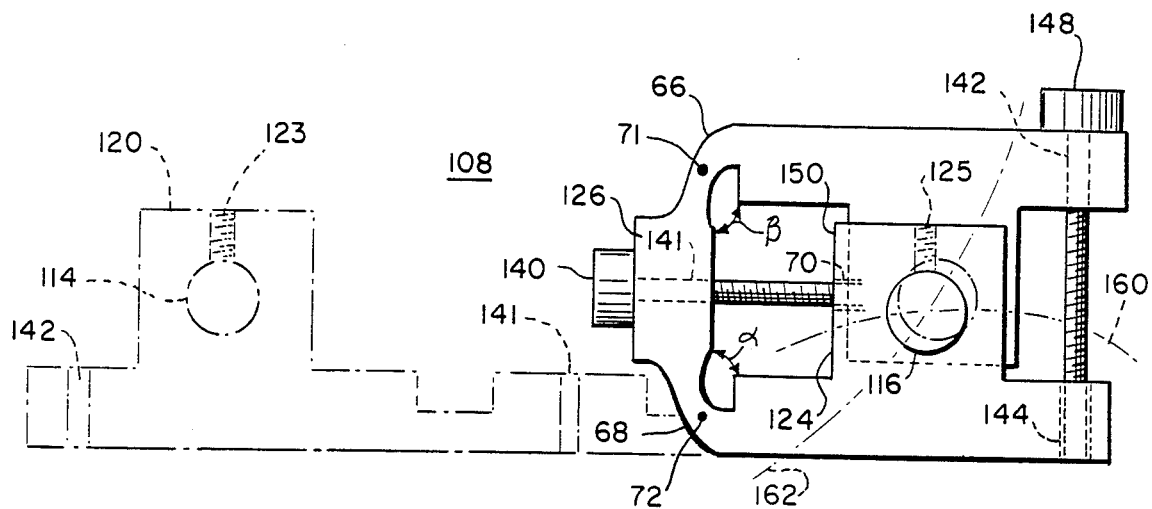
FIG. 5 is an elevational view of an assemblage of the parts of FIG. 4 that includes, shown in dotted outline, a portion of the construction of the main housing as it would appear prior to assembly.

In FIGS. 4 and 5, a connector 108 forming a a second embodiment of the invention is shown, with FIG. 4 illustrating certain portions of the connector 108 prior to assembly. Elements corresponding in function to those of FIGS. 1, 2 and 3 have their last two digits the same as the corresponding elements of the first embodiment.

Functionally, the connector 108 operates in essentially the same manner as the connector 8. Structurally, the connector 108 is very similar to the connector 8 with the primary difference being that the connector 108 is a unitary structure which is formed from a pliable, plastic material, such as polyvinyl chloride. More particularly, the connector 108 is first molded in the essentially planar shape of FIG. 4, and is then folded upon itself to form the connector configuration of FIG. 5.

Like the connector 8, the connector 108 includes a first sleeve 114, a second sleeve 116, a first member 120 which includes the first sleeve 114, a second member 124 which includes the second sleeve 116, a hinge plate 126, a first set screw 123, a second set screw 125, a first adjustment screw 140 and a second adjustment screw 148, all of which correspond to similar elements of the first embodiment.

In lieu of the separate springs 46 and 52 of the connector 8, the connector 108 includes two necked regions 66 and 68 each of which includes respective pivot points 71 and 72 and each of which because of its thinness and pliability functions as a spring, as will be more fully discussed below.

To enable movement of the hinge plate 126 in response to rotations of the first adjustment screw 140, the first adjustment screw 140 is received in an unthreaded bore 141 of the hinge plate 126 and is threadably coupled to a threaded bore 70 on a face 150 of the second member 124. With the second member 124 held fixed, as the first adjustment screw 140 is rotated clockwise in threaded bore 70, hinge plate 126 pivots about the pivot point 72 and moves toward the face 150 of the second member; as the first adjustment screw 140 is rotated counterclockwise, the hinge plate 126 is retracted away from the face 150. The movement of hinge plate 126 causes the first member 120, that is hingeably connected to plate 126, to move in concert.

The angle α formed between the necked region 68 and the second member 124 decreases for clockwise rotations and increases for counterclockwise rotations of the first adjustment screw 140. As the angle α is varied, the sleeve 114 is repositioned along a largely horizontal arcuate path 160.

The second adjustment screw 148 is received through an unthreaded bore 142 at an edge of the first member 120 and is coupled to a threaded bore 144 at an edge of second member 124. The second adjustment screw 148 is used to move the first member 120 downward or upward relative to the second member 124 in response to clockwise or counterclockwise rotations, respectively, of the second adjustment screw 148. When the second adjustment screw is rotated, the first member 120 is pivoted about the pivot point 71 in a manner such that the angle β formed between the hinge plate 126 and the first member 120 decreases for clockwise rotations and increases for counterclockwise rotations of the second adjustment screw 148. As the angle β is varied, the end of the first optical conductor 110 that is housed in first member 120 is repositioned along a largely vertical arcuate path 162 which intersects the largely horizontal arcuate path 160.

The necked regions 66 and 68 of the hinge plate 126 provide a spring biasing force for causing a surface of the hinge plate 126 to bear continuously against an inner surface of the head of the first adjustment screw 140 as the first adjustment screw 140 is rotated in either direction. Further, the spring biasing affect of necked region 66 provides the spring response attributed to the coil spring 46 of the first embodiment to maintain a surface of the first member 120 against an inner surface of the head of the second adjustment screw 148 during rotations of the second adjustment screw 148.

Either of the two embodiments of the connector, as previously described, can be used repeatedly to obtain optimum conductor-to-conductor interfaces. Advantageously, a suitable index matching material may be used to form intimate contact between the adjacent termini of the conductors to reduce interface losses.

It is to be understood that the above-described embodiments are mainly illustrative of the principles of the invention. One skilled in the art may make changes and modifications to the embodiments disclosed herein and may devise other embodiments without departing from the scope and the essential characteristics thereof.

What is claimed is:

1. An apparatus for aligning a pair of articles comprising:
   (a) a first member for holding a first article;
   (b) a second member for holding a second article;
   (c) hinge means, having a first end hingeably connected to a first end of said first member and having a second end hingeably connected to a first end of said second member, for connecting said first member to said second member such that said first member may pivot about the first and second ends of said hinge means so as to enable relative motion to occur between said first and second members;
   (d) first adjustment means for pivoting the first member relative to said second end of the hinge means so as to provide selective arcuate movement of the first article relative to the second article along a first arcuate path; and
   (e) second adjustment means for pivoting said first member relative to said first end of the hinge means so as to provide selective arcuate movement of the first article relative to the second article along a second arcuate path intersecting said first arcuate path.

2. A connector for positioning the termini of a pair of optical components in axial alignment comprising:
   (a) a first L-shaped member for holding a terminus of a first optical component;
   (b) a second L-shaped member for holding a terminus of a second optical component, said second member having a leg extending parallel to a leg of said first member and a base extending parallel to a base of said first member with said leg of said first member extending toward said base of said second member and said leg of said second member extending toward said base of said first member, with said second L-shaped member disposed so as to complement said first L-shaped member;

(c) hinge means, having a first end hingeably connected to a first end of said first L-shaped member and having a second end hingeably connected to a first end of said second L-shaped member, for connecting said first L-shaped member to said second L-shaped member such that said first L-shaped member may pivot about the first and second ends of said hinge means so as to enable relative motion to occur between said first and second L-shaped members;

(d) first adjustment means for pivoting said first L-shaped member relative to said second end of said hinge means so as to provide selective arcuate movements of the terminus of the first optical component relative to the terminus of the second optical component along a first arcuate path; and (e) second adjustment means for pivoting said first L-shaped member relative to said first end of said hinge means so as to provide selective arcuate movement of the terminus of the first optical component relative to the terminus of the second optical component along a second arcuate path intersecting the first arcuate path.

3. A connector in accordance with claim 2 wherein each said L-shaped member has a base with a height dimension in an axial direction substantially equal to a length dimension of a leg, and wherein said base of each of said members has an aperture extending the height of said base for receiving the termini of the optical components.

4. A connector in accordance with claim 3 including a first and a second sleeve, said first sleeve being slidably and rotatably mounted in said aperture of said first L-shaped member and said second sleeve being slidably and rotatably mounted in said aperture of said second L-shaped member, said first and second sleeves also including means for retaining therein the termini of the first and second optical components, respectively.

5. A connector in accordance with claim 4 including a first and a second set screw, said first and second set screws being threadably coupled in threaded bores in the bases of said first and second L-shaped members, respectively, said first set screw having an end surface that terminates on a surface of said first sleeve within said aperture in said base of said first L-shaped member, and said second set screw having an end surface that terminates on a surface of said second sleeve within said aperture of said base of said second L-shaped member.

6. A connector in accordance with claim 2 wherein said hinge means is an H-shaped plate having a recess region between a pair of legs at both a first and a second end of said H-shaped plate forming said respective first and second ends of said hinge means.

7. A connector in accordance with claim 6 wherein said H-shaped hinge plate has a threaded bore in one leg of said pair of legs and wherein said first adjustment means includes:

(a) a first adjustment screw threadably coupled within said threaded bore in said one leg of said H-shaped hinge plate and having an end surface bearing against a surface of said second L-shaped member; and (b) first biasing means pivotally mounted in the recess region at the second end of said H-shaped hinge plate, said first biasing means having a first portion bearing against a surface of said H-shaped hinge plate and a second portion bearing against a surface of said second L-shaped member for exerting, simultaneously, a force against said H-shaped hinge plate and said L-shaped second member in such directions that the end surface of said first adjustment screw maintains contact with the surface of said second L-shaped member during the occurrence of a clockwise or counterclockwise rotation of said first adjustment screw, the rotation of said first adjustment screw causing said H-shaped hinge plate to pivot about the hinge connection at said second end of said hinge plate, the pivoting of said H-shaped hinge plate causing said first L-shaped member, which is hingeably connected with said first end of said H-shaped hinge plate, to also pivot relative to said second end of said H-shaped hinge plate.

8. Apparatus in accordance with claim 7 wherein said first biasing means is a torsion spring.

9. A connector in accordance with claim 7 wherein said first and second L-shaped members, respectively, include a recess region at a second end of each and wherein said second adjustment means includes:

(a) a second adjustment screw;

(b) a first and a second beam pivotally mounted in the respective recess regions at the second ends of said first and second L-shaped members, one of said beams having an unthreaded bore extending therethrough and the other of said beams having a threaded bore also extending therethrough, said first and second beams receiving said second adjustment screw in said bores; and (c) second biasing means disposed about said second adjustment screw having the ends of said second biasing means bearing against said first and second beams, respectively, for causing a surface of said one beam to remain juxtaposed to an inner surface of the head of said second adjustment screw during the occurrence of a clockwise or a counterclockwise rotation of said second adjustment screw, such that said first beam moves toward or away from said second beam in response to clockwise or counterclockwise rotations of said second adjustment screw, the movement of said first beam in turn causing movement of said first L-shaped member to occur such that an angle, formed between the hinge connection of said hinge means and said first member, decreases for rotations of said second adjustment screw in a first direction, and increases for rotations in a second direction.

10. A connector in accordance with claim 9 wherein said second biasing means is a coil spring.

11. A connector in accordance with claim 9 wherein said second adjustment means includes means for pivoting simultaneously said first and second beams about respective pivotal axes in the individual recess regions of said first and second L-shaped members in response to rotations of said first adjustment screw, the rotations of said first adjustment screw causing movement of said H-shaped hinge plate to occur such that an angle, formed between the hinge connection of said H-shaped hinge plate and said second L-shaped member, decreases in response to rotations of said first adjustment screw in a first direction and increases for rotations in a second direction.

12. A connector, formed from a pliable material, for positioning the termini of a pair of optical components in axial alignment comprising:
 (a) a first member, having an aperture therethrough, for receiving and holding a terminus of a first optical component of said pair of components;
 (b) a second member, having an aperture therethrough, for receiving and holding a terminus of a second optical component of said pair of components;
 (c) hinge means having a first end hingeably connected to said first member and a second end hingeably connected to said second member for connecting said first member to said second member such that said first member may pivot about the first and second ends of said hinge means, said first and second members along with said hinge means constituting portions of a single integral unit of the pliable material;
 (d) a first adjustment screw coupled between said hinge means and said second member for pivoting said hinge means about the hinge connection formed with said second member for moving said first member such that the terminus of said first optical component is moved relative to the terminus of said second optical component along a first arcuate path; and
 (e) a second adjustment screw coupled between first and second members for pivoting said first member about the hinge connection formed with said hinge means and for moving said first member such that the terminus of said first optical component is moved relative to the terminus of said second optical component along a second arcuate path that intersects the first arcuate path.

13. A connector in accordance with claim 12 wherein said hinge means is a hinge plate, said hinge plate having first and second necked regions at the first and second ends of said hinge plate; said first and second necked regions, forming pliable springs, serving to cause a surface of said first member to remain juxtaposed to an inner surface of a head of said second adjustment screw during the occurrence of a clockwise or counterclockwise rotation of said second adjustment screw.

14. A connector in accordance with claim 13 wherein said hinge plate includes a bore therethrough; and said second member has a threaded bore in alignment with said hinge plate bore; and wherein said first adjustment screw is routed through bore of said hinge plate and is threadably coupled to said threaded bore of said second member.

15. A connector in accordance with claim 12 also including first and second sleeves slidably and rotatably mounted in said apertures of said first and second members, respectively, for retaining therein the termini of said first and second optical components;
 said members also including means for locking said first and second sleeves in a fixed alignment within said apertures.

* * * * *